United States Patent [19]

Neises

[11] 3,891,080

[45] June 24, 1975

[54] BOTTLE RECEIVING APPARATUS

[75] Inventor: Reuben J. Neises, Wisconsin Dells, Wis.

[73] Assignee: Leroy F. Stertz, Marshfield, Wis. ; a part interest

[22] Filed: Oct. 29, 1973

[21] Appl. No.: 410,957

[52] U.S. Cl. ............... 198/43; 193/4; 193/18; 193/32; 198/52; 198/69
[51] Int. Cl.² ..................................... B65G 47/00
[58] Field of Search ............... 198/43, 47, 50–52, 198/69; 193/4, 7, 12, 17, 18, 24, 25 R, 32

[56] References Cited
UNITED STATES PATENTS

| | | | |
|---|---|---|---|
| 2,557,001 | 6/1951 | Kohl | 198/47 |
| 2,925,162 | 2/1960 | De Tuncq | 193/32 |
| 3,732,961 | 5/1973 | Thornton et al. | 193/32 |

Primary Examiner—Evon C. Blunk
Assistant Examiner—Jeffrey V. Nase
Attorney, Agent, or Firm—Theodore J. Long; John M. Winter; Harry C. Engstrom

[57] ABSTRACT

A bottle receiving apparatus having a guideway for receiving bottles at an upper location and discharging the bottles at a lower loction into a bottle receptacle. The guideway has a lower curved channel which increases the frictional forces on downwardly sliding bottles to cause substantial deceleration of said bottles before discharging them from the guideway. The bottle receptacle has a bottle receiving surface located beneath the discharge end of the guideway which is movable in the same direction as the direction of discharge of the bottles to receive the bottles while in motion and to stop the bottles by stopping movement of the bottle receiving surface after the bottle is received thereon.

4 Claims, 5 Drawing Figures

PATENTED JUN 24 1975

3,891,080

SHEET 1

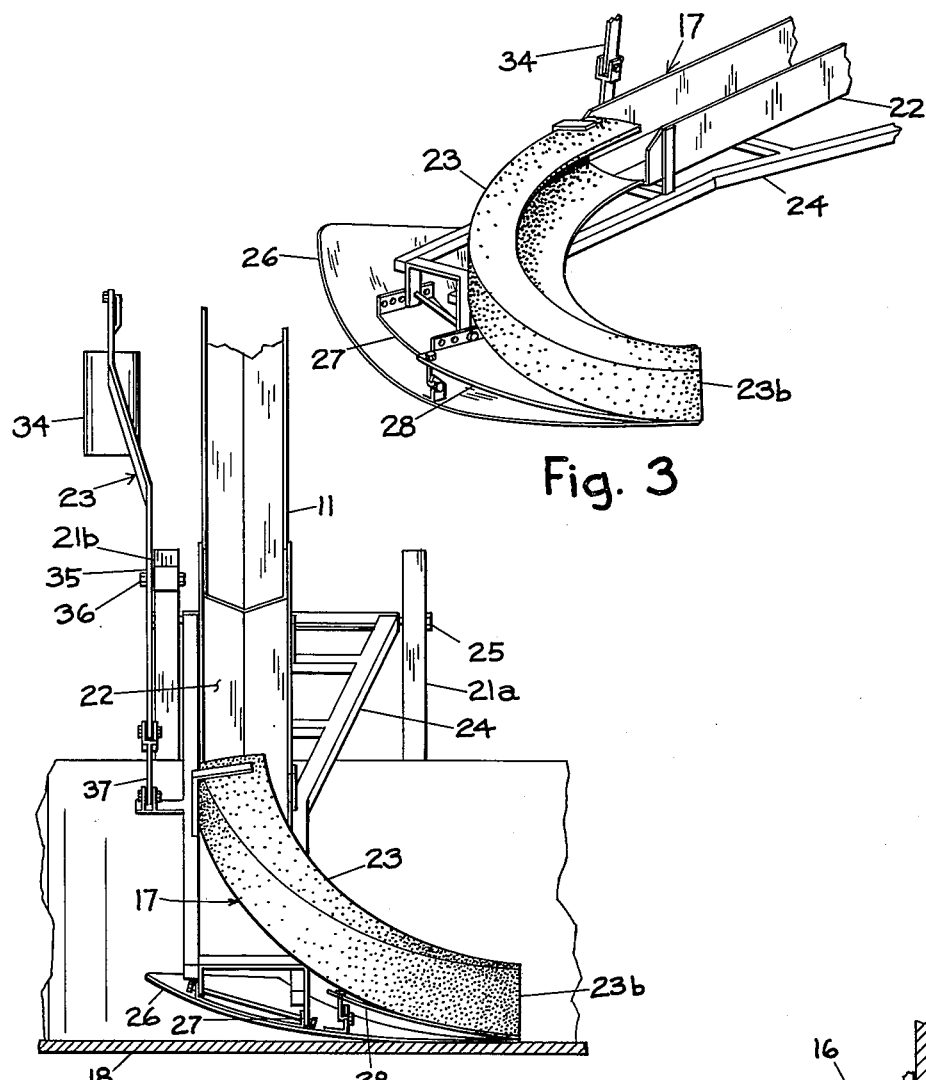
Fig. 3
Fig. 4
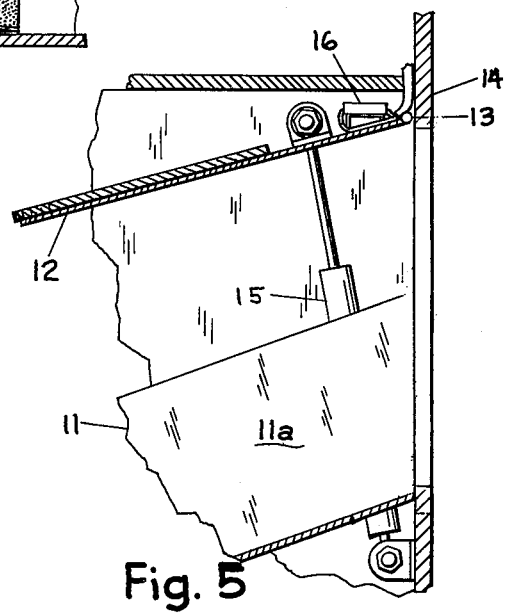
Fig. 5

BOTTLE RECEIVING APPARATUS

BACKGROUND OF THE INVENTION

1. Field of the Invention

This invention pertains to the field of bottle receiving apparatus, and more particularly to devices which receive bottles at one location and transfer them to a remote location for accumulation and storage.

2. Description of the Prior Art

A large number of empty bottles must generally be handled by establishments such as restaurants, bars, grocery stores and the like. It is often inconvenient or impossible to store these bottles at the place where they are originally received or emptied. However, it is usually neither economical nor convenient to frequently hand carry the collected bottles to a remote location where they may be suitably accumulated and stored pending further disposition. Of course it is important that the collected bottles be handled without breakage, since a substantial proportion of these bottles are reusable, and are ultimately returned to the beverage manufacturer in exchange for a "deposit" or other allowance.

Several devices have been developed which transfer bottles from a receiving location to a storage location with the object of minimizing or eliminating breakage of the bottles during the transfer process. Illustrative of these devices is the bottle receiver disclosed in Kohl, U.S. Pat. No. 2,557,001. The Kohl patent discloses a chute through which bottles descend by gravity, and an endless conveyor which receives bottles from the chute. The conveyor carries bottles at a uniform rate into a rotating receiving tray, thereby controlling the impact of the bottles as they enter the tray. Another method of controlling the entry rate of bottles into a receiving tray is shown in an earlier U.S. Pat. to Kohl, et al., No. 2,296,444 (1942). This patent discloses a device wherein bottles descend by gravity through a chute, and an energy absorbing bumper head at the terminus of the chute slows down the bottles.

The difficulty of reliably delivering bottles intact to a storage location is demonstrated by the complexity of the known bottle receivers, which usually require a conveyor or multiple conveyors. This complexity carries with it the problems of high initial cost, reliability, wasted space and high maintenance costs. Additionally, adaptability to bottles of widely varying shapes and sizes is lessened where equipment is designed to physically grasp or hold a bottle.

Economical and reliable bottle handling equipment is important to reduce unnecessary bottle breakage and costly replacement thereof. In addition, the throw-away bottle, though ecologically undesirable, has become dominant in large part because of the costs of recycling returnable bottles. Reducing the cost and inconvenience of recycling will be helpful in reversing the trend toward throw-away bottles.

SUMMARY OF THE INVENTION

I have invented a bottle receiving apparatus which transfers bottles from a location where bottles are received to an accumulation and storage location while minimizing breakage. This objective is accomplished economically and with a minimum of moving parts.

My bottle receiving apparatus has a guidway through which bottles slide by gravity from the receiving location to a lower level. The lower portion of the guideway is curved to slow the bottles down to a substantially uniform rate of speed. The bottles slide from the discharge end of the guideway into a bottle receptacle which is rotating in the direction of motion of the discharged bottles to reduce the impact on them. The lower portion of the guideway is pivotally mounted, and is counterweighted to ride up more easily on the bottles which accumulate in the bottle receptacle.

The lower curved channel of the guideway is preferably helical in shape. This helical channel is preferably composed of a material, such as rubber or soft plastic, which has a high coefficient of kinetic friction with respect to glass bottles but does not damage a glass surface. Some frictional force will be exerted by the helical channel on a moving bottle by virtue of the gravitational force exerted by the bottle on the channel. However, frictional force will also be exerted on the bottle by the curved channel because of the certrifugal force exerted by the sliding bottle on the curved channel, and this frictional force may be considerably greater than the frictional force due to gravity. The centrifugal force, and hence the corresponding frictional force, will be proportional to the mass and angular velocity of each bottle, thus tending to compensate for variations in the size and speed of the bottles and thereby slow them down to a substantially uniform speed.

A cover at the receiving end of the fixed guideway is pushed open by a bottle inserted into the guideway, and a switch closed by the opened cover operates an electric motor which drives the rotating bottle receptacle. The cover is provided with a pneumatic closer which causes the cover to close slowly enough to ensure that the receptacle will continue rotation until after the bottle is deposited therein.

Further objects, features, and advantages will be apparent from the following detailed description taken in conjunction with the accompanying drawings showing a preferred embodiment of a bottle receiving apparatus exemplifying the principles of my invention.

BRIEF DESCRIPTION OF THE DRAWINGS

In the drawings:

FIG. 3 is a perspective view showing a portion of the apparatus of FIG. 1.

FIG. 4 is a fragmentary cross-sectional view taken along the line 4—4 of FIG. 1.

FIG. 5 is a fragmentary side view of the upper portion of a preferred embodiment of my bottle receiving apparatus.

DESCRIPTION OF THE PREFERRED EMBODIMENT

Figure 1:
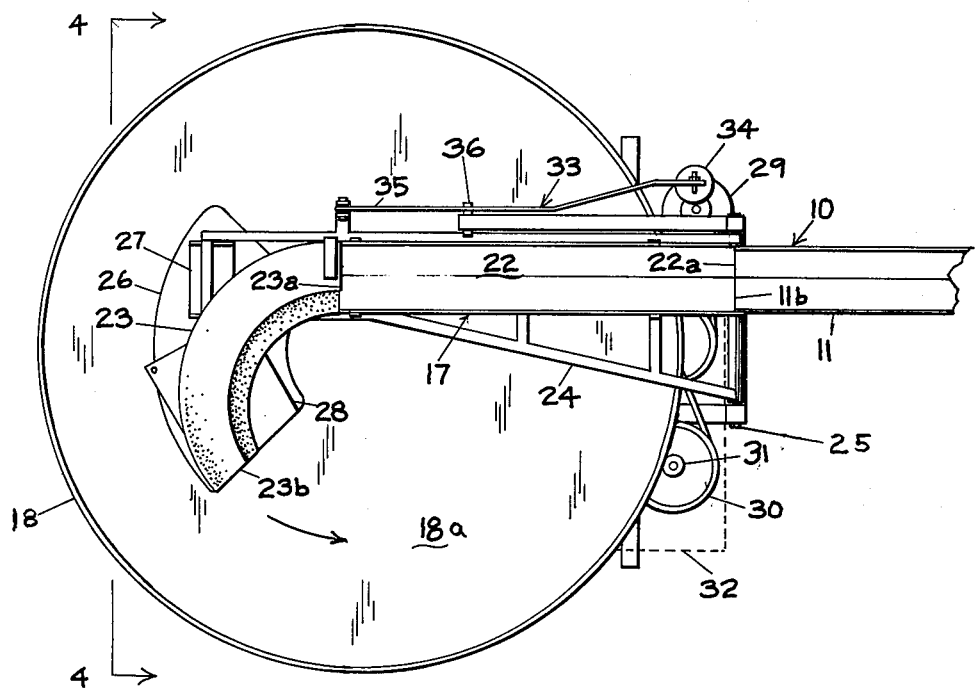
FIG. 1 is a top view of the lower portion of a preferred embodiment of my bottle receiving apparatus.
Figure 2:
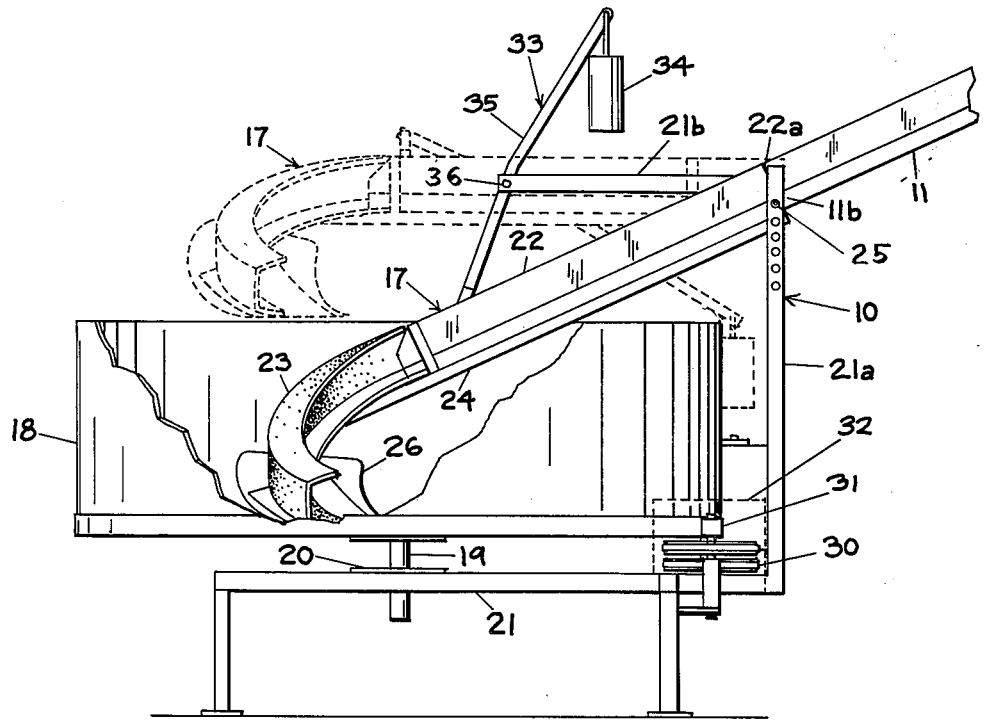
FIG. 2 is a side elevation view of the lower portion of the apparatus of FIG. 1, with parts thereof broken away.

Referring now more particularly to the drawings wherein like numerals refer to like parts throughout the several views, my bottle receiving apparatus is shown generally at 10 in FIGS. 1 and 2. The bottle receiving apparatus 10 has guideway means including a fixed descending guideway 11, a movable guideway 17 and guideway support frame 24. The fixed guideway 11 has a bottle receiving end 11a and a lower end 11b. The guideway 11 may be a metal or plastic channel as shown in the drawings, but may also be made in any other convenient shape which is effective to channel bottles from the receiving end 11a to the lower end 11b, without damage.

As shown in FIG. 5, a cover 12 normally closes the receiving end 11a of the guideway 11. The cover 12 is mounted by a hinge 13 to a head plate 14 surrounding the cover 12. The head plate 14 is preferably mounted in a wall or in a cabinet behind a bar, but if necessary, the guideway 11 may extend from the floor and support the head plate 14 in a free standing position. The cover 12 is pushed inwardly when a bottle is inserted into the receiving end 11a of the guideway, and a pneumatic closer 15 is attached between the cover and the head plate 14 to return the cover to its closed position at a controlled rate. A normally open limit switch 16 is mounted on the cover 12 in position to be closed when the cover 12 is opened by an inserted bottle, with the switch 16 remaining closed until the pneumatic door closer 15 returns the cover to a substantially closed position.

As best shown in FIGS. 1 and 2, a bottle inserted into the fixed guideway receiving end 11a slides down the fixed guideway 11 by gravity and passes from the fixed guideway lower end 11b to the movable guideway 17. The movable guideway 17 slows the speed of the bottle, as will be subsequently explained, and the bottle gently slides from the movable guideway into a cylindrical bottle receptacle 18. The portion of the bottle receiving surface 18a of the receptacle 18 which underlies the discharge end 23a of the movable guideway is movable in the direction of discharge of the bottles, as shown by the arrow in FIG. 1, to receive the discharged bottle while in motion to further reduce the force of impact of the bottle on the surface 18a. The structure and operation of the receptacle 18 will be more fully described at a later point in this description.

The movable guideway 17 has a substantially linear portion consisting of a straight channel 22. The straight channel 22 is located just beneath and adjacent to the lower end 11b of the fixed guideway 11. The movable guideway 17 also has a descending curved channel 23, preferably helical in form, which extends downwardly from the straight channel 22 and has an upper end 23a and a discharge end 23b. The discharge end 23b of the helical channel 23 is located above the bottle receiving surface 18a of the bottle receptacle 18, in position to deposit bottles therein. The straight channel 22 may be formed and constructed as indicated above for the fixed guideway 11. However, the helical channel 23 is preferably made of a material, such as rubber or soft plastic, that has a relatively high coefficient of kinetic friction with respect to glass, but which will not harm the surface of the sliding glass bottles. Normally, the helical channel material will have a substantially higher coefficient of kinetic friction than will the straight channel 22 and fixed guideway 11.

A support frame 24 is attached to and rigidly supports the straight channel 22 and helical channel 23 of the movable guideway 17. The frame 24 is pivotally attached to a vertical extension 21a of a stationary frame 21 by a pivot pin 25. As best shown in FIG. 2, the pivot pin 25 is located proximate to the upper end 22a of the straight channel 22 to minimize rotational movement thereof; thus the upper end 22a is maintained underneath and adjacent to the lower end 11b of the fixed guideway 11 to insure passage of bottles from the fixed guideway 11 to the movable guideway 17 regardless of the pivotal position of the movable guideway 17.

As best shown in FIGS. 3 and 4, a curved sled plate 26 is attached by a pivotally movable mounting bracket 27 to the guideway means support frame 24. Another mounting bracket 28 supports the discharge end 23b of the helical channel 23 in proper position on the sled plate 26. The sled plate 26 has an upward curvature in a direction opposite to the direction of movement of the underlying portion of the bottle receiving surface 28a, as shown in FIG. 4, to allow the sled plate to ride up on bottles accumulated on the bottle receiving surface as the receptacle rotates.

The bottom bottle receiving surface 18a of the receptacle 18 is affixed at its geometric center to a vertical shaft 19 which provides support for the receptacle. The shaft 19 is journaled for rotational motion in a bearing plate 20 which is itself mounted to and supported by the stationary frame 21.

The receptacle 18 is rotated by means of an electric motor 29 mechanically connected through a set of reduction pulleys 30 to a drive pinion 31 which is maintained in continuous frictional contact with the circular periphery of the bottle receptacle 18. The electric motor 29 is connected to a source of electrical power through the switch 16, which thus controls operation of the motor 29 and rotation of the receptacle 18. When the guideway cover 12 is open, the switch 16 will be closed and the motor 29 will be running, causing the bottle receptacle to rotate. Substantially complete closure of the cover 12 opens the switch 16 and stops the rotation of the bottle receptacle. For safety purposes, a guard 32 is placed over the pulleys 30 and the drive pinion 31. The guard 32 is shown in dashed lines in FIGS. 1 and 2 to allow a view of the pulleys and drive pinion.

A counterweight mechanism 33 is provided to partially balance the torque around the pivot 25 produced by weight of the movable guideway 17 and its associated support frame 24 and sled plate 26. The counterweight mechanism 33 has a counterweight 34 which is pivotally attached to one end of a lever arm 35. The lever arm is mounted at an intermediate point thereof by a pivot 36 to a horizontal extension 21b of the stationary frame 21. The other end of the lever arm 35 is pivotally attached to a short link 37, which is itself pivotally attached to the support frame 24, as best shown in FIG. 4.

The operation of my bottle receiving apparatus 10 is actuated simply by pushing the cover 12 open with an empty bottle and placing the bottle in the receiving end 11a of the fixed guideway 11. The rotation of the bottle receptacle 18 begins when the cover is opened, as previously detailed, and the pneumatic closer 15 controls the rate of closure and ensures that the cover closes slowly enough so that the receptacle will still be rotating when the bottle slides from the helical channel discharge end 23b onto the bottle receiving surface 18a of the receptacle.

It is desirable that the bottles exit from the curved helical channel 23 at approximately the same speed as the tangential speed of that portion of the bottle receiving surface 18a which underlies the discharge end 23a of the helical channel, in order to minimize breakage from collisions with the receiving surface 18a or with other bottles. The helical channel accomplishes this end by exerting a frictional force on the bottles sliding through it. Because the channel is helical, a considerable component of the frictional force exerted on the bottles results from the centrifugal force exerted by the bottles on the helical channel. Since this centrifugal force is proportional to the mass and the angular velocity of the bottles, the helical channel tends to compensate for variations in size and speed of the bottles. Thus bottles will exit from the discharge end 23b of the channel at a substantially uniform speed, and the speed of the motor 29 and the pulleys 30 can be pre-designed so that the speed of rotation of the receiving surface 18a matches the average discharge speed of the various bottles from the helical channel 23.

As bottles accumulate in the bottle receptacle 18, the sled plate 26 will ride up on the bottles and maintain the discharge end 23b of the helical channel 23 just above the top layer of bottles. The counter weight mechanism 33 minimizes the drag on the bottles by the sled plate 26, and allows the sled plate, movable guideway 17, and support frame 24 to easily ride up on the bottles as they accumulate. The movable guideway 17 is shown in its fully raised position in dashed lines in FIG. 2. The bottles accumulated in the receptacle 18 may then be sorted and disposed of as desired.

It is understood that my invention is not confined to the particular construction and arrangement of parts herein illustrated and described, but embraces all such modified forms thereof as come within the scope of the following claims.

I claim:

1. A bottle receiving apparatus comprising:
  a. guideway means for receiving bottles at an upper location and permitting said bottles to slide downwardly by gravity to a lower location;
  b. said guideway means having an upper receiving end, a lower discharge end and a lower curved channel means for increasing the frictional forces on downwardly sliding bottles to cause substantial deceleration of said bottles before discharge thereof from said discharge end;
  c. a bottle receptable beneath the discharge end of said guideway means, said receptacle having a bottle receiving surface which is movable beneath said discharge end in the direction of bottle discharge;
  d. a sled plate pivotally mounted to said guideway means, said sled plate being positioned to support said lower curved channel means on said bottle receiving surface, said sled plate having an upward curvature in a direction opposite to that of the underlying bottle receiving surface movement to permit the sled plate to ride over bottles; and
  e. said lower curved channel means and said sled plate mounted thereto being upwardly movable, said sled plate being normally biased against the bottle receiving surface of the bottle receptacle and riding on top of discharged bottles in said receptacle as the quantity of bottles in said receptacle increases.

2. The bottle receiving apparatus specified in claim 1 wherein said lower curved channel means comprises a helical channel.

3. The bottle receiving apparatus specified in claim 1 including means associated with said guideway means for actuating movement of said bottle receiving surface when a bottle is received by said guideway means and for stopping movement of said bottle receiving surface after the bottle has been discharged onto said bottle receiving surface.

4. A bottle receiving apparatus comprising:
  a. guideway means for receiving bottles at an upper location and permitting said bottles to slide downwardly by gravity to a lower location;
  b. said guideway means having an upper receiving end, a lower discharge end and a lower curved channel means for increasing the frictional forces on downwardly sliding bottles to cause substantial deceleration of said bottles before discharge thereof from said discharge end;
  c. a bottle receptacle beneath the discharge end of said guideway means, said receptacle having a rotatable bottle receiving surface which is movable beneath said discharge end in the direction of bottle discharge;
  d. electrically activated means for rotating said bottle receiving surface;
  e. a hinged cover normally closing the upper receiving end of said guideway means, said cover being movable to an open position by insertion of a bottle into said guideway means;
  f. closer means for closing said cover at a controlled rate so that said cover will be closed after an inserted bottle is discharged onto said bottle receiving surface; and
  g. a switch operated by movement of said cover and electrically connected to said electrically activated means, said switch being positioned so that when a source of electrical power is connected to said switch and when said cover is moved to its open position said switch will be closed to actuate movement of said bottle receiving surface, and when said cover is returned to its normally closed position said switch will be opened to stop movement of said bottle receiving surface.

* * * * *